(12) United States Patent
Busch

(10) Patent No.: US 6,981,333 B2
(45) Date of Patent: Jan. 3, 2006

(54) ERGONOMIC, INTERFERENCE SIGNAL-REDUCING POSITION MEASUREMENT PROBE FOR MUTUAL ALIGNMENT OF BODIES

(75) Inventor: Dieter Busch, Ismaning (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 427 days.

(21) Appl. No.: 09/729,422

(22) Filed: Dec. 5, 2000

(65) Prior Publication Data

US 2001/0020335 A1 Sep. 13, 2001

(30) Foreign Application Priority Data

Dec. 8, 1999 (DE) ................. 199 59 220

(51) Int. Cl.
*G01C 19/00* (2006.01)
(52) U.S. Cl. ................. 33/645; 33/318; 33/366.11; 33/286
(58) Field of Classification Search ................. 33/312, 33/318, 328, 365, 366.11, 412, 529, 613, 33/645, 370, 373, 371, 372, 286, 293
See application file for complete search history.

(56) References Cited

U.S. PATENT DOCUMENTS

| | | | | |
|---|---|---|---|---|
| 4,524,526 A | * | 6/1985 | Levine | ................. 33/312 |
| 4,551,921 A | * | 11/1985 | Puyo et al. | ................. 33/366 |
| 5,224,835 A | | 7/1993 | Oltman | |
| 5,331,578 A | * | 7/1994 | Stieler | ................. 33/1 N |
| 5,408,751 A | * | 4/1995 | Rodloff | ................. 33/318 |
| 5,526,282 A | * | 6/1996 | Nower | ................. 33/412 |
| 5,554,975 A | * | 9/1996 | Hall et al. | ................. 340/573.7 |
| 5,689,330 A | * | 11/1997 | Gerard | ................. 33/291 |
| 5,980,094 A | * | 11/1999 | Nower | ................. 33/412 |
| 6,040,903 A | * | 3/2000 | Lysen | ................. 33/412 |
| 6,085,428 A | * | 7/2000 | Casby et al. | ................. 33/286 |
| 6,195,615 B1 | | 2/2001 | Lysen | |
| 6,223,102 B1 | * | 4/2001 | Busch | ................. 33/645 |
| 6,435,044 B1 | * | 8/2002 | Adolph | ................. 33/336 |

FOREIGN PATENT DOCUMENTS

| | | | |
|---|---|---|---|
| DE | 195 06 471 | 8/1996 | |
| DE | 198 00 901 | 7/1999 | |
| EP | 0 928 591 | 7/1999 | |
| JP | 02116708 | * 5/1990 | ................. 33/356 |
| JP | 10-160432 | 6/1998 | |
| WO | WO 97/21980 | 6/1997 | |
| WO | WO 97/36146 | 10/1997 | |

\* cited by examiner

*Primary Examiner*—Christopher W. Fulton
*Assistant Examiner*—Travis Reis
(74) *Attorney, Agent, or Firm*—Nixon Peabody LLP; David S. Safran

(57) ABSTRACT

An ergonomically equipped and interference signal-reducing position measurement probe for mutual alignment of bodies has a speech input device and/or a speech output device. The probe is wirelessly linked to an external control or a higher-level supervisory computer either by an infrared interface or a radio link which operates at an extremely high frequency. Error-reducing measured value acquisition is effected by averaging. The average represents several individual measured value. In the acquisition of the individual measured values, it is watched that the times of measured value recording and the time peaks of a solid-borne sound oscillation on the measurement object are essentially asynchronous to one another.

7 Claims, 3 Drawing Sheets

US 6,981,333 B2

ERGONOMIC, INTERFERENCE SIGNAL-REDUCING POSITION MEASUREMENT PROBE FOR MUTUAL ALIGNMENT OF BODIES

BACKGROUND OF THE INVENTION

1. Field of the Invention

The invention relates to a position measurement probe for mutual alignment of bodies and a process for efficient application of such a position measurement probe.

2. Description of Related Art

A position measurement probe of the initially mentioned type is known from published International Patent Application Document No. WO 97/21980 and U.S. Pat. No. 6,195,615 which resulted from the U.S. National Phase thereof, in which it is described how the mutual alignment of bodies, especially parallel alignment of shafts, rollers, or the like, can be greatly facilitated and accelerated by first determining a reference direction using a first body by means of a high-precision measurement device, and storing it as a comparison value with reference to a suitable coordinate system. In a subsequent measurement process with the same position measurement probe, the alignment of a second body is determined in a high precision manner, so that errors in mutual alignment of these bodies can be detected by comparison, i.e., subtraction of the acquired measurement results. Other bodies can be checked in the same way in subsequent measurements. Following the comparison of the measurement results, correction of the alignment of these bodies can be performed, the choice of a suitable reference direction being essentially optional. According to U.S. Pat. No. 6,195,615, however, it is not specified how the device should be made externally or which particular boundary conditions in its operation must be observed to carry out the process in the best possible and most efficient manner.

Another position measurement probe of the type to which the invention is directed is known from published German Patent Application No. DE 19800901.1 which, as a result of the measurement principle proposed there, can have an extremely small structural shape, and accordingly, can be provided with an ergonomically configured handle for simplified operation. However, in spite of the improvements described in DE 19800901.1, a more extensive teaching is lacking with respect to the details of the device and particulars of the process, by means of which the most accurate measurement results possible can be achieved in an especially prompt and efficient manner.

SUMMARY OF THE INVENTION

The primary object of the present invention is to eliminate the aforementioned defects economically and to make available a measurement probe with which generic measurement tasks can be handled with still greater efficiency.

This object is achieved with devices and processes as are described below, and especially, by a configuration of the device in accordance with the invention which is suitable for receiving voice commands of an operator, and by means of speech-recognition hardware and software for processing them, such that consistent switching is accomplished into another desired machine state. Furthermore, the measurement probe in accordance wit the invention can be implemented by a device which is able to deliver signals which can be understood by a speech output means or to articulate the determined measurement results in natural speech.

For more prompt and improved acquisition of measurement values of interest, an individual key or trigger means is attached at an ergonomically especially favorable location, actuation of which by the thumb or index finger of the an operator leads to a single current measurement value (or a current average of several measured values) being stored. To do this, an electronic storage is provided.

Furthermore, the device in accordance with the invention can be made such that it has a high-resolution display device for reproduction of alphanumeric and graphic information with which an operator can recognize whether and in which manner any alignment and other correction measures can be carried out on the just measured articles.

The device according to the invention can be used as a complete device, or it can also be connected to an external control or with a higher-level supervisory computer. In this way, it is possible to reduce the weight of the measurement probe to be transported, by which handling is facilitated. Since the use of connecting cables between the aforementioned components would be disadvantageous to the extent that the concentration of the operator on the actual measured value recording is disturbed, it is provided that the externally arranged separate control or a higher-level supervisory computer is to be wirelessly connected. To do this, both in the measurement probe and also in the indicated control or supervisory computer, there are data transmission devices which are equipped with infrared interfaces or which work by means of extremely high frequency radio waves in the centimeter range.

However, since not only are the indicated connecting cables disruptive, but also pin-shaped antenna elements also adversely affect the working process, in a special embodiment of the invention, it is provided that a transmitting or receiving antenna for the indicated radio waves be integrated into one of the handles with which the device is to be equipped.

To the extent, in conjunction with measured value recording by the indicated supervisory computer or external controls individual control and storage function are carried out, it can be advantageous to localize the speech output or speech input functions provided in accordance with the invention on these devices, weight can be saved. However, it is especially advantageous to provide this speech-based support both in the indicated external devices and also in the portable actual measurement probe.

To reduce measurement errors as much as possible, the invention calls for determining an average for the individual measurement process which is based on several measured values which are acquired in one sequence at different times. High-precision measurement of the orientation of the measurement probe and the body to be measured can be subsequently disrupted by unintentional additional movements. The invention calls for identifying vibrations and other periodic movements of a measured object before the measurement process. In this way, the indicated averaging can be carried out such that the effect of those periodic movements which are caused by the technical line frequency (16, 50, 60 Hz) or a rotating machine part remains limited to a minimum. To do this, according to a first procedure of the invention, it is enough to carry out a time-sequential succession of individual measured value acquisitions in a stochastic, nonperiodic manner to supply the individually acquired measured values to averaging. The average values obtained in this way are then more accurate that those which are randomly disrupted by a prevailing solid-borne sound frequency.

In a second approach according to the invention, to solve this component problem, attention is focussed on the fact that individual measured values which are to be supplied to averaging are not acquired with a frequency (or integral fraction thereof) which lies in the ranges from 47 to 53 Hz or from 56 Hz to 64 Hz or is in the range of another technical line frequency. Also frequency ranges and the pertinent subharmonics which agree with the rotational or vibration frequency of a machine integrated into a body to be measured can be avoided in accordance with the invention. The same applies to other periodic oscillations which appear more strongly on the measurement object, the cause of which may be unknown. These oscillations are detected, first of all, by means of suitable measurement probes and are then input by keyboard or speech input into the measurement probe, or into its pertinent peripherals. Also in this way, randomly vibration-induced movements can be prevented from having an effect on the measurement result.

In a third procedure according to the invention, to solve the aforementioned component problem, first, the spectrum of the vibrational movements possibly present at the measurement location is recorded, for which commercial measurement devices are used. It is then ascertained at which frequency the current acceleration or velocity values are minimum, and the measured values are taken for determining the orientation of the articles with just this frequency or an integral part thereof. This ensures that the effect of vibrational movements is reduced to an amount as low as possible. However, as mentioned above, there is the assumption that from a plurality of individual measured values acquired in this way, a pertinent average is formed. In accordance with the invention, the validity of this average can be checked by a pertinent amount of variance not exceeding predefined boundary values. When overly large variance values occur, according to the invention, an error signal can be given or the computed average is immediately discarded.

The object of the invention is achieved using a device in accordance with the invention in a process for measurement and for assessment of the mutual alignment of bodies which contains the following steps:
making contact between a measurement probe and a first body which has a reference surface or a reference edge,
inputting a command by an operator to the measurement probe by speech input,
waiting, if necessary, for an optical or acoustic, especially speech-linked, acknowledgement signal,
making contact between a measurement probe and a second body which has a measurement surface or a measurement edge,
inputting of another command to the measurement probe by speech input,
waiting, if necessary, for an optical or acoustic, especially speech-linked, acknowledgement signal,
inputting, if necessary, of dimension data which describe the arrangement or distances of the articles relative to one another, by means of a keyboard and/or by a speech input means, or using a display which facilitates ordered or structured input of dimension data,
computing the geometrical data which describe the mutual orientation of bodies in a differential manner,
outputting information, especially of measured value information, which has differences of orientation between the first and the second body on an optical or acoustic, especially speech-linked, basis to an operator,
if necessary, outputting information which can enable an operator to undertake correction or calibration measures on either the first or the second body so that mutual alignment of these bodies is improved.

Another approach arises in the use of the following process for measuring and assessing the mutual alignment of bodies which is characterized by the following steps:
determining solid-borne sound quantities which are present in the vicinity, or directly on, a stipulated measurement surface of the bodies to be measured,
analyzing solid-borne sound quantities according to periodic and nonperiodic portions,
determining a frequency which is characterized by a minimum value of the periodic portions of the determined and analyzed solid-borne sound quantities,
acquiring multiple, average-forming measured values for displaying of orientation indication values on one of the bodies with a repetition frequency which corresponds to that frequency at which the minimum of the periodic portions of solid-borne sound quantities has been recognized and with an integral fraction of this frequency.

The invention is explained in greater detail below using the examples shown in the drawings.

DETAILED DESCRIPTION OF THE INVENTION

Figure 1:
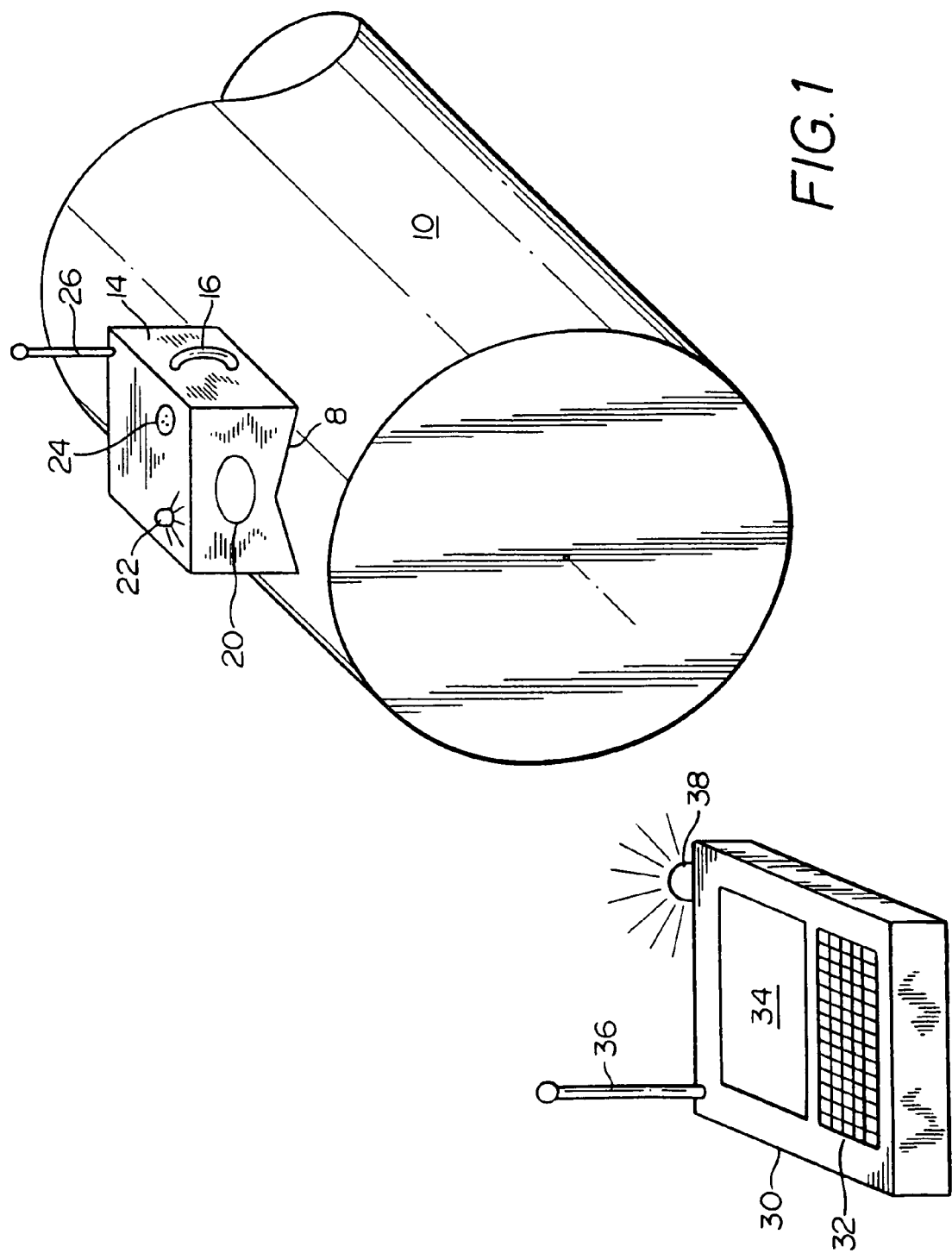
FIG. 1 is a perspective view of a position measurement probe in accordance with the invention, which is seated on a roller which is to be measured, in interplay with an external control.

The measurement probe 14 which is shown in FIG. 1 is suited for continuously fixing its inertial orientation in space or with reference to a laboratory coordinate system. To do this, probe 14 has at least two optical gyros together with the pertinent electronics (not shown), as is known in the art. The measurement probe 14 is advantageously set up such that it compensates for the rotary motion caused by the rotation of the earth by means of technology which is likewise known in the art.

As is shown in FIG. 1, the measurement probe 14 is seated, for example, with its prismatic housing surface 8 on the surface of a roller 10, and thus, determines its orientation relative to three angle coordinates in space, usually called pitch, yaw and roll angles. To seat the measurement probe on the surface to be measured, there are handles, for example, of which one handle 16 is shown, like handle being provided on the opposite face of the probe. The measurement probe 14 can either process self-contained the signals obtained by the optical gyros, or it can have this done by an external, especially a portable or movable computer or control unit 30. (This computer has at least one display unit 34 and an input means 32, for example, in the form of a keyboard).

In accordance with the invention, at least one, preferably two wireless data transmission means are provided, one of which is installed in the measurement probe 16, with a second being optionally provided in the computer 30. Reference numbers 22, 38 indicate the pertinent transponder means with which data transmission is optically producible, for example, by means of data transmission systems which operate using infrared. To do this, advantageously, a data transmission protocol can be used as is defined in accordance with the so-called IRDA interface. Alternatively, faster data transmission can be carried out by means of the so-called USB interface which is offered not only over wires, but also wirelessly.

Instead of photo-optical data transmission, alternatively or additionally, radio frequency data transmission can be utilized. In this respect, FIG. 1 shows antennas 26, 36 working as transponder elements with transmission frequencies preferably in the available gigahertz bands. In one special embodiment of the invention, in which is a designed to keep the size of the measurement probe 14 especially small, the antenna 26 is integrated into the handle 16.

In accordance with the invention, it is provided that the effort of an operator can be extensively facilitated by the possibility of commands to the measurement probe taking place by speech input. This is especially helpful when the relatively sensitive and expensive measurement probe 14 is to be protected against accidental impacts by the operator's continually guiding the device with at least one hand, if it is not in a parked position. For purposes of speech input, a microphone 24 is integrated into the measurement probe. In addition, there can also be operator guidance by speech output which can ask an operator to repeat a measurement to output a readiness signal, to make information on the current quality of the measurement results, and comparable information. For this purpose there is a loudspeaker 20. A headset 25 with a microphone 24' and earphones 20' can be provided for use in addition to or instead of microphone 24 and loudspeaker 20 to reduce ambient noise interference.

Figure 2:
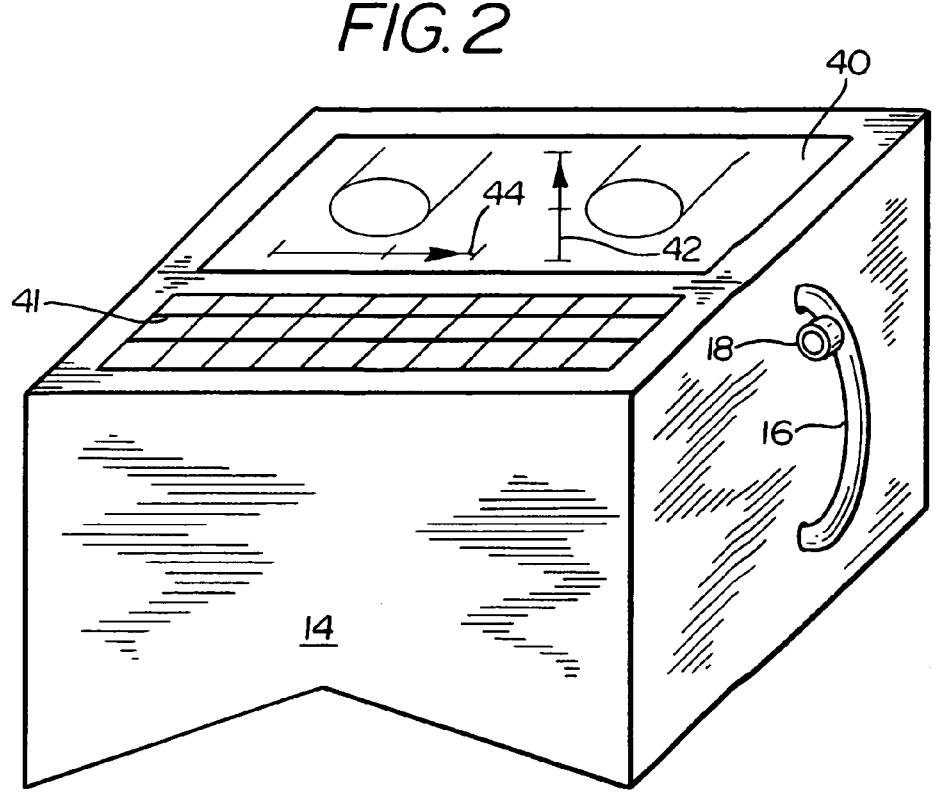
FIG. 2 is an enlarged representation of a position measurement probe which is equipped with a display.

Furthermore, in one preferred embodiment of the invention, the measurement probe 14 contains a display 40 (FIG. 2) with which measurement results can be visualized. The displayed results can be not only numerical characteristics which indicate whether and to what extent misalignment of a roller to be measured or the like is present, but in particular additional values can displayed in graphic form. The additional information displayed can indicate how to obtain the best possible correction of an ascertained error angle. As FIG. 2 shows, for example, on the display 40, bar graphs or comparable visualization elements can be displayed. The bar graph 44 indicates the size and direction of a current misalignment of a measured body in azimuth, while the bar graph 42 indicates a similar measurement result for elevation. In order, to comfortably signal the start or end of a measurement interval, there can be a touch key or push button 18 if the device does not have the previously described speech input possibility.

Figure 3:
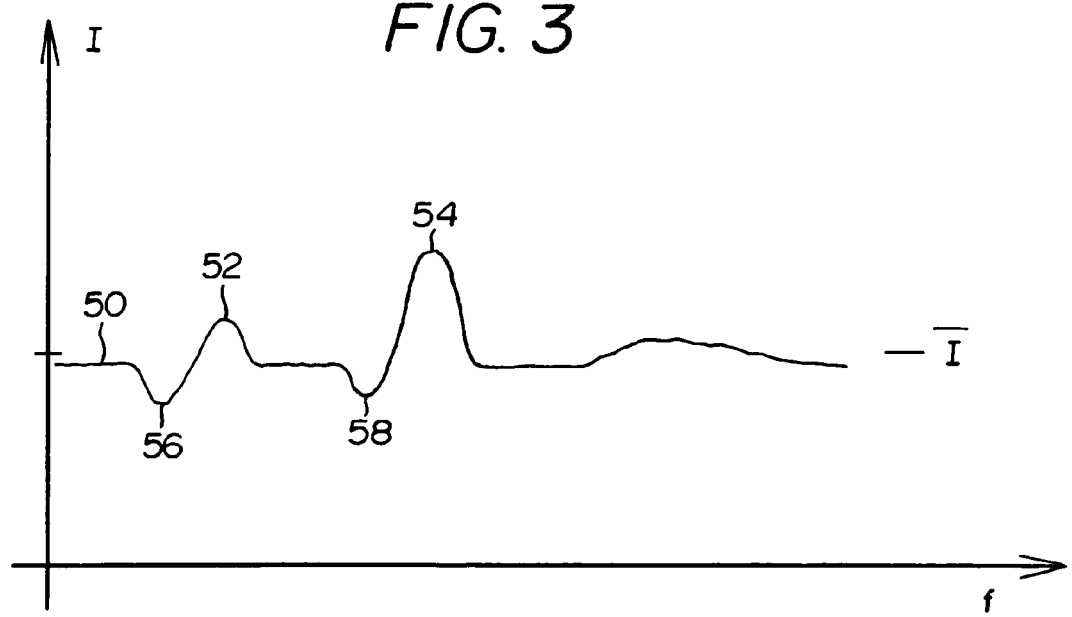
FIG. 3 is a plot of a solid-borne sound frequency spectrum which exists at the measurement site.
Figure 4:
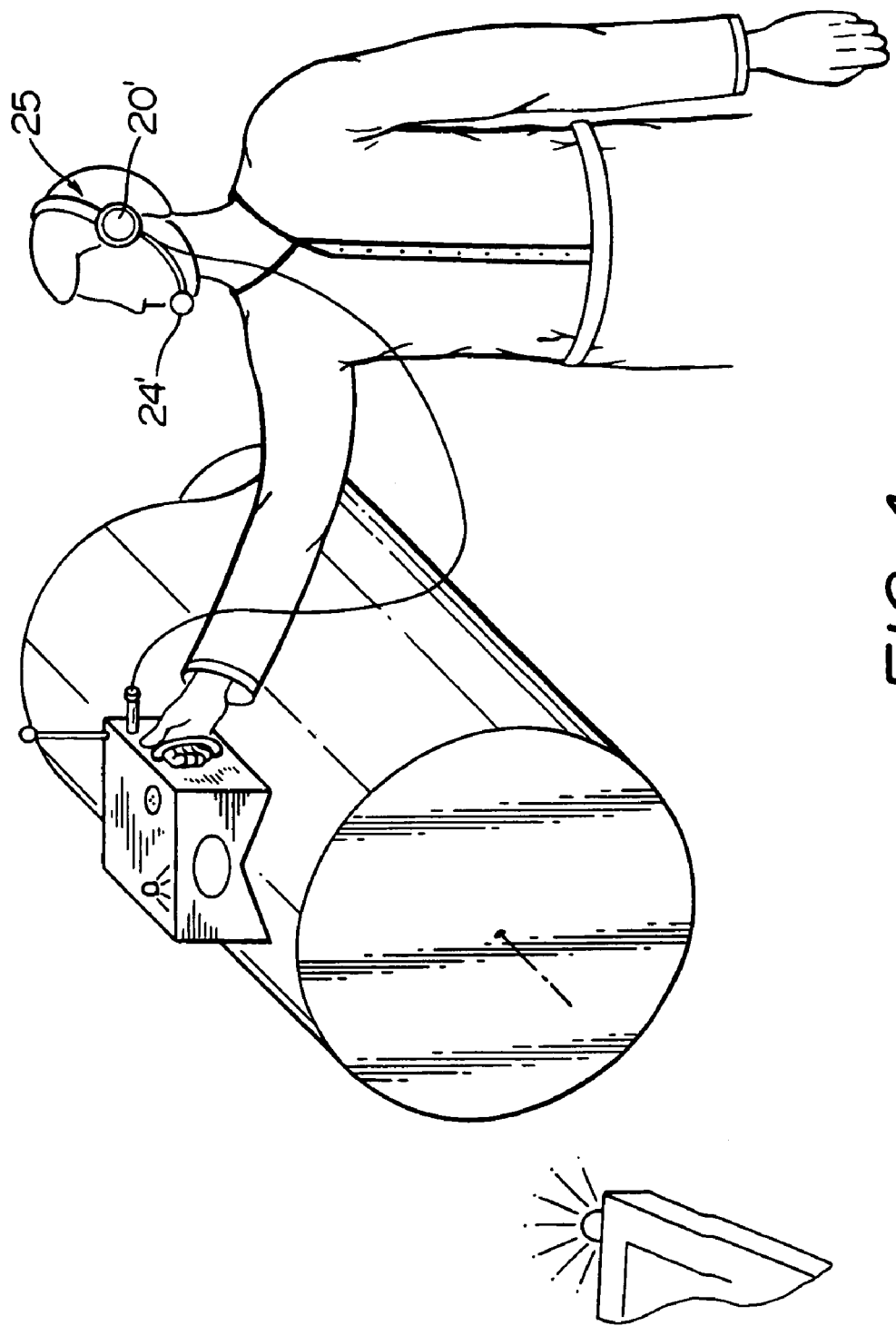
FIG. 4 shows a position measurement probe which is being controlled by an operator using a headset microphone.

The acoustic spectrum shown in FIG. 3 relates to vibrations and solid-borne sound vibrations as are acquired at an intended measurement site by means of suitable devices on which a measurement probe is or are placed. The intensity I of the vibration speed over frequency f is shown. If these vibrations exceed a certain amount, they can be incorporated into a measurement result which is obtained by means of the measurement probe as the error quantity. The spectrum shown in FIG. 3 has, for example, a low frequency portion 50 which is in the vicinity of an average value 1/I. Furthermore, peak values 52, 54 of the spectrum are shown, as are the portions 56, 58 which occur less strongly.

The indicated error influence is reduced in accordance with the invention by not only an individual measured value being used for determining the location and orientation of a measurement probe, but several of them which are combined into an average. This represents a first measure for reducing the indicated error by which, at the same time, other error influences are reduced. However, it is important according to the invention to acquire several measured values at those time intervals such that no synchronization phenomena with a prevailing solid-borne sound oscillation occur. This can be achieved either by the acquisition of individual measured values in a stochastic manner, i.e., in a dedicated manner, irregularly and with random time intervals between the measurements.

Alternatively, one such measurement sequence can be carried out with the same time intervals (therefore with a constant frequency). However, it should be watched that this frequency or multiple thereof does not coincide with the frequency which is assigned to an intensity peak of 52, 54. Rather, it is more favorable to take repeated individual measurements with one such frequency which corresponds to the intensity minima 56, 58 or which represents a partial frequency (subharmonic) of these frequencies. Fundamentally, it is useful to avoid that measurement frequency which is integrally related to the technical line frequency (for example, 16.6 Hz, 50 Hz, 60 Hz),

What is claimed is:

1. Device for measuring and assessing the mutual alignment of bodies, with at least one optical gyro enclosed within a housing, wherein the housing has means for manually transporting the housing and for holding the housing in place on a body whose state of alignment is to be determined, and wherein the device is provided with transmission means for wirelessly receiving or exchanging at least one of data, commands and other information with an externally arranged control or a higher-level supervisory computer, wherein the externally arranged control or higher-level supervisory computer has means for performing an averaging measured value acquisition to ascertain the spatial orientation of the bodies or the device in a time-sequential manner with a measurement frequency which excludes the following frequency ranges or values, integral fractions or integral multiples thereof:

the range from 47 to 53 Hz or from 56 Hz to 64 Hz
   the range of a technical line frequency
   a rotational or oscillation frequency of a machine integrated into the bodies to be measured
   a frequency band which is located in the immediate vicinity of a mechanical acceleration frequency which occurs at a selected measurement site with above average intensity or which can appear there.

2. Device as claimed in claim 1, wherein said transmission means is a data transmission device utilizing one of infrared light and extremely high frequency radio waves as a data carrier.

3. Device according to claim 1, wherein an antenna for transmitting or receiving extremely high frequency radio waves is integrated into a handle of the device.

4. Device as claimed in claim 1, wherein the externally arranged control or a higher-level supervisory computer contains a speech input or speech output function.

5. Device as claimed in claim 1, wherein the externally arranged control or higher-level supervisory computer has means for carrying out a time-sequential succession of measured value acquisitions to ascertain the orientation of bodies in a stochastic, nonperiodic manner.

6. Device as claimed in claim 1, wherein the externally arranged control or higher-level supervisory computer has means for acquiring averaging measured values at a selected measurement site for ascertaining the spatial orientation of bodies or the device in a time-sequential manner with a measurement frequency at which current mechanical acceleration values with comparatively low intensity are represented or assume a minimum value.

7. Process for measuring and assessing the mutual alignment of bodies, comprising the following steps:
- manually holding a measurement probe having an optical gyro enclosed within a housing that has means for manually transporting the housing and for holding the housing in place against a first body which has a reference surface or edge;
- inputting a command by an operator to the measurement probe by speech input while the measurement probe is being manually held by the operator;
- waiting, if necessary, for one of an optical, acoustic and speech-linked acknowledgement signal;
- manually holding the measurement probe against a second body which has a measurement surface or a measurement edge.
- inputting of another command to the measurement probe by speech input while the measurement probe is being manually held by the operator,
- waiting, if necessary, for one of an optical, acoustic, and speech-linked acknowledgement signal;
- inputting, if necessary, of dimension data which describe an arrangement or distances of the bodies relative to one another, by means of at least one of a keyboard, a speech input means and a display which facilitates ordered or structured input of dimension data;
- computing geometrical data which describe the mutual orientation of the bodies in a differential manner;
- outputting of information which has differences of orientation between the first and the second body, on one of an optical, acoustic, and speech-linked basis, to an operator; and
- if necessary, outputting of information which can enable an operator to undertake at least one of correction and calibration measures on either the first body or the second body so that mutual alignment of these bodies is improved.

* * * * *